US011598963B2

(12) United States Patent
Lin

(10) Patent No.: US 11,598,963 B2
(45) Date of Patent: Mar. 7, 2023

(54) HEAD-MOUNTED DISPLAY DEVICE AND FRAME DISPLAYING METHOD USING THE SAME

(71) Applicant: Acer Incorporated, New Taipei (TW)

(72) Inventor: Shang-Yao Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 119 days.

(21) Appl. No.: 17/326,832

(22) Filed: May 21, 2021

(65) Prior Publication Data
US 2021/0396999 A1 Dec. 23, 2021

(30) Foreign Application Priority Data

Jun. 19, 2020 (TW) ................. 109120853

(51) Int. Cl.
G02B 27/01 (2006.01)
G09G 3/20 (2006.01)
(52) U.S. Cl.
CPC ............. *G02B 27/017* (2013.01); *G09G 3/20* (2013.01); *G02B 2027/014* (2013.01); *G09G 2360/18* (2013.01); *G09G 2370/16* (2013.01)
(58) Field of Classification Search
None
See application file for complete search history.

(56) References Cited

U.S. PATENT DOCUMENTS

2018/0246334 A1\* 8/2018 Yajima ...................... G06F 3/14
2019/0090158 A1\* 3/2019 Das ........................ H04W 28/16

FOREIGN PATENT DOCUMENTS

| CN | 103091844 A | 5/2013 |
| CN | 105580349 A | 5/2016 |
| CN | 106537227 A | 3/2017 |
| CN | 108605148 A | 9/2018 |
| CN | 110007464 A | 7/2019 |
| TW | 201640373 A | 11/2016 |

\* cited by examiner

*Primary Examiner* — Ifedayo B Iluyomade
(74) *Attorney, Agent, or Firm* — Birch, Stewart, Kolasch & Birch, LLP

(57) ABSTRACT

A head-mounted display device including a processor and a display is provided. The processor is configured to: determine whether a display load of the head-mounted display device is higher than a preset load; when the display load is higher than the preset load, select at least one external device capable of making the display load lower than the preset load from a plurality of external devices; and, transmit a to-be-calculated information to at least one external device. The display is configured to: display a calculated information received from the at least one external device.

12 Claims, 2 Drawing Sheets

HEAD-MOUNTED DISPLAY DEVICE AND FRAME DISPLAYING METHOD USING THE SAME

This application claims the benefit of Taiwan application Serial No. 109120853, filed Jun. 19, 2020, the subject matter of which is incorporated herein by reference.

BACKGROUND OF THE INVENTION

Field of the Invention

The invention relates in general to a display device and a frame displaying method using same, and more particularly to a head-mounted display device and a frame displaying method using same.

Description of the Related Art

In order to display lifelike frames with wide view-angles, the head-mounted display device needs to process a large volume of video streams. However, the volume of video streams varies with time. When the head-mounted display device displays a large volume of video streams, the display frames will be delayed, the display quality will deteriorate, and the viewers may even feel dizzy watching the display frames. Therefore, it has become a prominent task for the industries to provide a technology capable of resolving the above problems.

SUMMARY OF THE INVENTION

Therefore, the present invention provides a head-mounted display device and a frame displaying method using same for resolving the problems commonly encountered in the prior art.

According to one embodiment of the present invention, a head-mounted display device (HMD) is provided. The head-mounted display device includes a first processor and a display. The first processor is configured to: determine whether a display load of the head-mounted display device is higher than a preset load; when the display load is higher than the preset load, select at least one external device capable of making the display load lower than the preset load from a plurality of external devices; and transmit a to-be-calculated information to at least one external device. The display is configured to: display a calculated information received from the at least one external device.

According to another embodiment of the present invention, a frame displaying method of a head-mounted display device is provided. The frame displaying method includes the following steps. Whether a display load of a head-mounted display device is higher than a preset load is determined. When the display load is higher than the preset load, at least one external device capable of making the display load lower than the preset load is selected from a plurality of external devices. A to-be-calculated information is transmitted to at least one external device. A calculated information received from the at least one external device is displayed.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
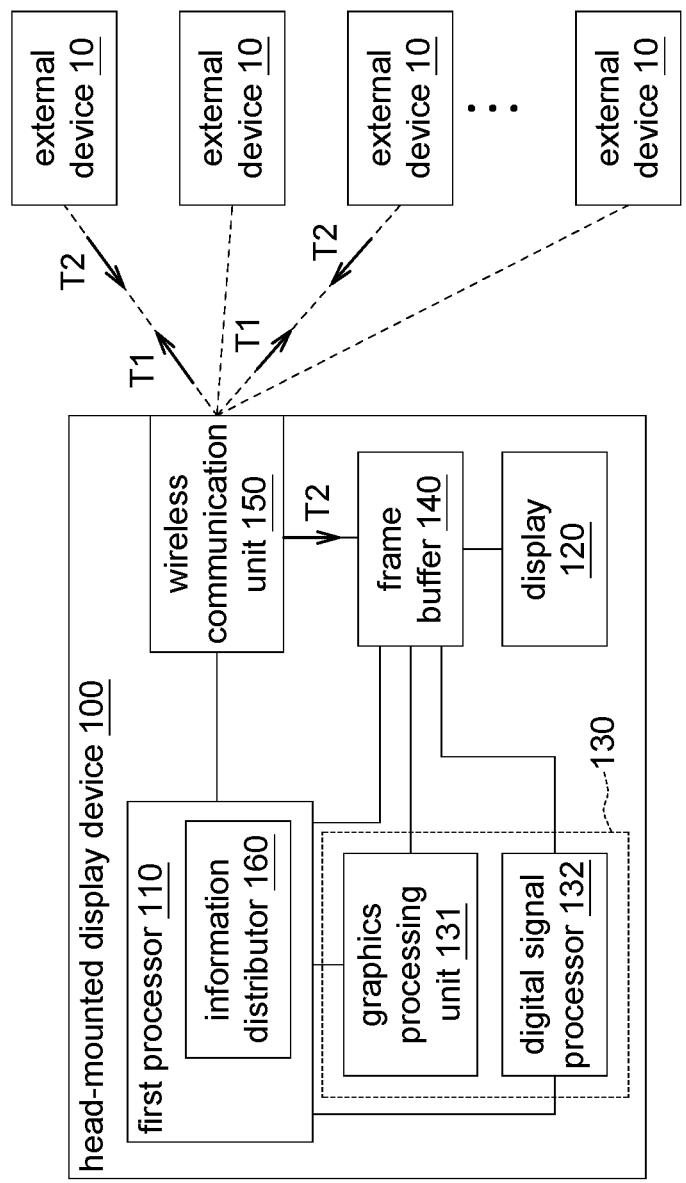
FIG. 1 is a functional block diagram of a head-mounted display device according to an embodiment of the present invention.

Referring to FIG. 1, a functional block diagram of a head-mounted display device (HMD) according to an embodiment of the present invention is shown. The head-mounted display device 100 includes a first processor 110, a display 120, at least one second processor 130, a frame buffer 140, a wireless communication unit 150 and an information distributor 160.

The head-mounted display device 100 can be realized by a head-mounted display device capable of displaying extended reality (XR) frames. The content of XR includes virtual reality (VR), augmented reality (AR) and mixed reality (MR). The first processor 110, the second processor 130, the frame buffer 140 and the wireless communication unit 150 can be realized by a physical circuit, such as chip or semiconductor package, formed by a semiconductor process. In an embodiment, at least two of the first processor 110, the second processor 130, the frame buffer 140 and the wireless communication unit 150 can be integrated as one single element; or, at least two of the second processor 130, the frame buffer 140 and the wireless communication unit 150 can be integrated as the first processor 110. The display 120 can be realized by a liquid crystal display or other display capable of displaying XR frames. Besides, the frame buffer 140 can be realized by a memory.

The first processor 110 is configured to: (1) determine whether a display load of the head-mounted display device 100 is higher than a preset load; (2) when the display load is higher than the preset load, select at least one external device 10 capable of making the display load lower than the preset load from a plurality of external devices 10; and, (3) transmit a to-be-calculated information T1 to at least one external device 10. The display 120 is configured to: display a calculated information T2 received from the at least one external device 10. Thus, when the display load is higher than the preset load, the head-mounted display device 100 can allocate the information volume in excess of the load to at least one external device (such as for calculation), such that the display load is lower than the preset load and the display quality of the display 120 can be maintained or increased.

Additionally, the to-be-calculated information T1 is such as each XR frame of the video stream, and "the information volume in excess of the load" is at least one part of the to-be-calculated information T1.

In an embodiment, the first processor 110 can be realized by a central processing unit (CPU). The determination condition of the "load" includes frame rate and/or latency, wherein the unit of frame rate is such as frame per second (fps), and the unit of latency is such as millisecond. "The determination that the display load is higher than the preset load" includes at least one of the following conditions: (1) the frame rate is less than (or equivalent to) 90 fps; (2) the latency is greater than (or equivalent to) 20 milliseconds. Conversely, "the determination that the display load is lower than the preset load" includes at least one of the following conditions: (1) the frame rate is greater than 90 fps; (2) the latency is less than 20 milliseconds.

The external devices 10 can be realized by notebook computers, desktop computers, cloud servers, tablet computers and other electronic devices with information computing capabilities, which normally include elements similar to the first processor 110 and/or the second processor 130 of the head-mounted display device 100. The to-be-calculated information T1 includes a to-be-calculated data and an algorithm, and the external devices 10 can process (or calculate) the to-be-calculated data according to the algorithm. In an embodiment, the external devices 10 simply processes the to-be-calculated data according to the algorithm, that is, the external devices 10 simply processes (or calculates) the to-be-calculated data according to the algorithm without checking the purpose, use and/or functions of the to-be-calculated data. After the calculation is completed, the external devices 10 transmit the calculated information T2 back to the head-mounted display device 100. The wireless communication unit 150 of the head-mounted display device 100 receives and then transmits the calculated information T2 to the frame buffer 140. The display 120 obtains the calculated information T2 from the frame buffer 140 and then displays corresponding XR frames according to the calculated information T2. In an embodiment, after the calculated information T2 is transmitted back to the head-mounted display device 100, the calculated information T2 does not need to be processed by the first processor 110 and the second processor 130. Instead, the calculated information T2 is directly displayed on the display 120, such that the frame display speed can be increased, the frame rate can be less than 90 fps and/or the latency can be greater than 20 milliseconds.

The head-mounted display device 100 stores the log-in information (such as account number and password) of the external devices 10. When the head-mounted display device 100 searches the external devices 10, connection between the head-mounted display device 100 and the external devices 10 can be automatically established. In an embodiment, the connection between the external devices 10 and the head-mounted display device 100 can be maintained, such that the first processor 110 can save the connection time and can directly transmit the to-be-calculated information T1 to the external devices 10 in a real-time manner. In another embodiment, during the process when the display 120 continuously displays image frames, the first processor 110 can search connectable external devices 10 and request to establish connection with the connectable external devices 10 to increase the number of supporting external devices 10.

In an embodiment, before the to-be-calculated information T1 is transmitted to the external devices 10, the to-be-calculated information T1 can be compressed by the first processor 110 beforehand to reduce the transmission time. After the compressed to-be-calculated information T1 is received by the external devices 10, the compressed to-be-calculated information T1 is then de-compressed to the original to-be-calculated information T1. Moreover, before the external devices 10 transmit the calculated information T2 back to the head-mounted display device 100, the calculated information T2 can be compressed beforehand to reduce the transmission time. When the compressed calculated information T2 is received by the head-mounted display device 100, the compressed calculated information T2 is de-compressed to the original calculated information T2.

The second processor 130 can be realized by a graphics processing unit (GPU), a digital signal processor (DSP) or other processor with data processing (calculation) capabilities. The display load of the present invention refers to the overall load of the head-mounted display device 100, such as the overall load of the first processor 110 and the second processor 130.

The frame buffer 140 is electrically connected to the wireless communication unit 150 to temporarily store the calculated information T2 transmitted from the external devices 10. The wireless communication unit 150 is configured to: (1) receive a to-be-calculated information T1 from the first processor 110; (2) transmit the to-be-calculated information T1 to at least one external device 10; (3) receive a calculated information T2 from at least one external device 10; (4) transmit the calculated information T2 to the frame buffer 130. In an embodiment, the wireless communication unit 150 can support the fifth generation mobile communication technology (5G) communication protocols or Wi-Fi 802.11 ad/ay, and therefore can receive/transmit a large information volume within a short time and make the display load lower than the preset load.

The information distributor 160 can be realized by an application program, which includes the programming code for performing the said frame displaying method. After the first processor 110 loads in the information distributor 160, the first processor 110 performs the frame displaying method of the present invention. Furthermore, the external devices 10 can also load in an information distributor similar to the information distributor 160. Only those external devices 10 having loaded in the information distributor can communicate with the head-mounted display device 100 to perform the frame displaying method. In an embodiment, the head-mounted display device 100 can be realized by a server, and the external devices 10 can be realized by clients. The head-mounted display device 100 communicates with the external devices 10 according to communication protocols, which allow the head-mounted display device 100 and/or external devices 10 to perform at least one of the following actions: (1) explain the content of request; (2) report the resource state periodically; (3) determine whether to remain the on-line state. In an embodiment, the communication protocol is such as the real-time transport protocol (RTP).

Figure 2:
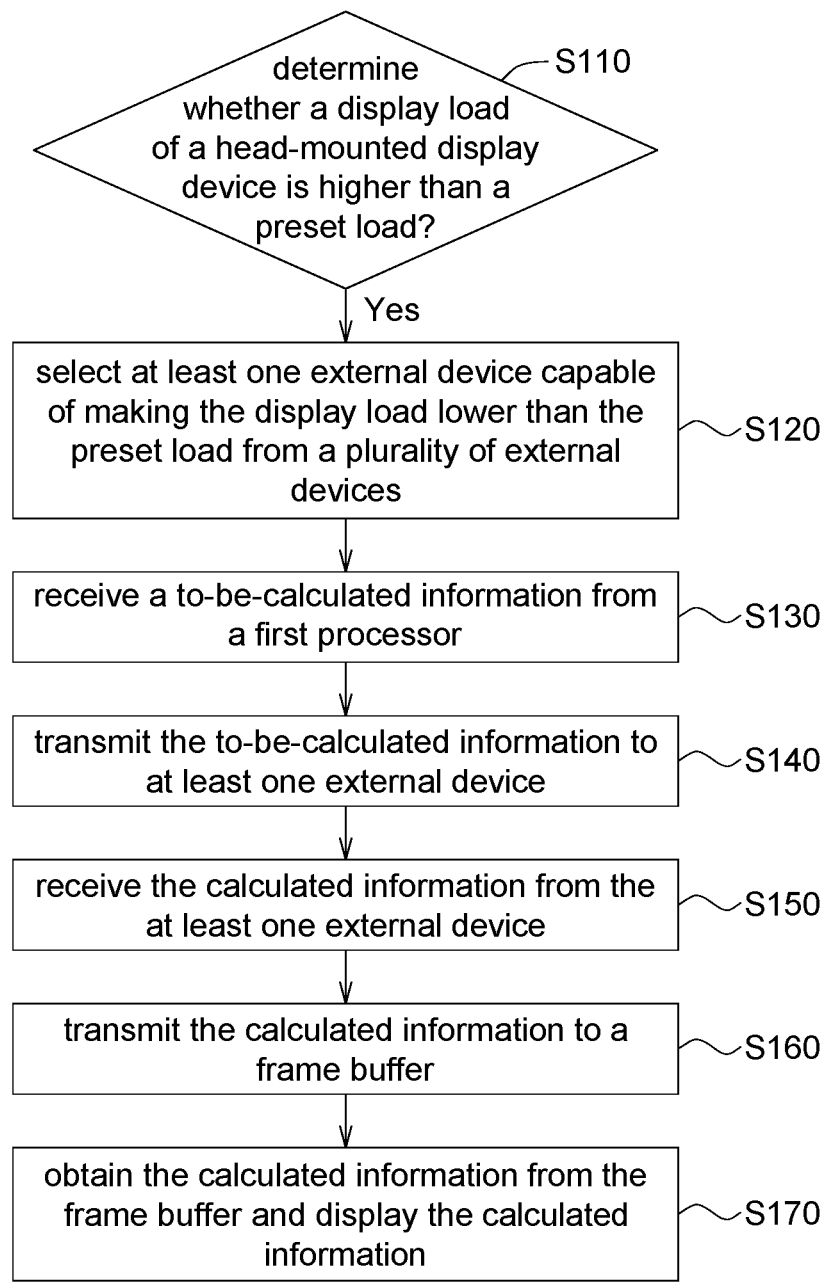
FIG. 2 is a flowchart of the frame displaying method of the head-mounted display device of FIG. 1.

Referring to FIG. 2, a flowchart of a frame displaying method of the head-mounted display device 100 of FIG. 1 is shown. According to an embodiment of the present invention, the frame displaying method of the head-mounted display device 100 is performed immediately after the first processor 110 loads in the information distributor 160, and the external devices 10 connected to the head-mounted display device 100 also load in mutually supporting resource distributors.

In step S110, whether a display load of the head-mounted display device 100 is higher than a preset load is determined by the first processor 110. When the display load is higher than the preset load, the method proceeds to step S120; when the display load is not higher than the preset load, the first processor 110 continues to determine whether the display load of the head-mounted display device 100 is higher than the preset load.

In step S120, when the display load is higher than the preset load, at least one external device 10 capable of making the display load lower than the preset load is selected from a plurality of external devices 10. Depending on the to-be-calculated information T1, not all external devices 10 need to process the to-be-calculated information T1. When no external devices 10 are capable of making the display load lower than the preset load, the head-mounted display device 100 alone processes the to-be-calculated information T1.

In step S130, the to-be-calculated information T1 is received from the first processor 110 by the wireless communication unit 150.

In step S140, the to-be-calculated information T1 is transmitted to at least one external device 10 by the wireless communication unit 150 using wireless communication technology.

In step S150, the calculated information T2 is received from the at least one external device by the wireless communication unit 150.

In step S160, the calculated information T2 is transmitted to the frame buffer 140 by the wireless communication unit 150.

In step S170, the calculated information T2 is obtained from the frame buffer 140 by the display 120, and corresponding XR frames are displayed according to the calculated information T2.

Besides, the head-mounted display device 100 can perform steps S110-S170 on each XR frame (such as the to-be-calculated information T1), and during the process, those XR frame whose display load is higher than the preset load are calculated by the external devices 10, such that the computing load of the head-mounted display device 100 can be reduced.

While the invention has been described by way of example and in terms of the preferred embodiment (s), it is to be understood that the invention is not limited thereto. On the contrary, it is intended to cover various modifications and similar arrangements and procedures and the scope of the appended claims therefore should be accorded the broadest interpretation so as to encompass all such modifications and similar arrangements and procedures.

What is claimed is:

1. A head-mounted display device (HMD), comprising:
   a first processor configured to:
      determine whether a display load of the head-mounted display device is higher than a preset load;
      when the display load is higher than the preset load, select at least one external device capable of making the display load lower than the preset load from a plurality of external devices; and
      transmit a to-be-calculated information to the at least one external device; and
   a display configured to:
      display a calculated information received from the at least one external device.

2. The head-mounted display device according to claim 1, wherein the determination that the display load is higher than the preset load comprises at least one of the following conditions: (1) frame rate is less than 90 frames per second (fps); (2) latency is greater than 20 milliseconds.

3. The head-mounted display device according to claim 1, wherein the to-be-calculated information comprises a to-be-calculated data and an algorithm, and the at least one external device is configured to process the to-be-calculated data according to the algorithm.

4. The head-mounted display device according to claim 1, wherein the head-mounted display device further comprises at least one second processor, and the display load is an overall load of the first processor and the at least one second processor.

5. The head-mounted display device according to claim 4, wherein the first processor is a central processing unit (CPU), and the at least one second processor comprises a graphics processing unit (GPU) and a digital signal processor (DSP).

6. The head-mounted display device according to claim 1, further comprising:
   a frame buffer; and
   a wireless communication unit electrically connected to the frame buffer and configured to:
      receive the to-be-calculated information from the first processor;
      transmit the to-be-calculated information to the at least one external device;
      receive the calculated information from the at least one external device;
      transmit the calculated information to the frame buffer;
   the display is further configured to:
      obtain the calculated information from the frame buffer to display the calculated information.

7. A frame displaying method of a head-mounted display device, comprising:
   determining whether a display load of a head-mounted display device is higher than a preset load;
   when the display load is higher than the preset load, selecting at least one external device capable of making the display load lower than the preset load from a plurality of external devices;
   transmitting a to-be-calculated information to the at least one external device; and
   displaying a calculated information received from the at least one external device.

8. The frame displaying method according to claim 7, wherein the determination that the display load is higher than the preset load comprises at least one of the following conditions: (1) frame rate is less than 90 fps; (2) latency greater than 20 milliseconds.

9. The frame displaying method according to claim 7, wherein the to-be-calculated information comprises a to-be-calculated data and an algorithm, and the at least one external device processes the to-be-calculated data according to the algorithm.

10. The frame displaying method according to claim 7, wherein the head-mounted display device further comprises at least one second processor, and the display load is an overall load of the first processor and the at least one second processor.

11. The frame displaying method according to claim 10, wherein the first processor is a central processing unit, and the at least one second processor comprises a graphics processing unit and a digital signal processor.

12. The frame displaying method according to claim 7, further comprising:
   receiving the to-be-calculated information from the first processor;
   transmitting the to-be-calculated information to the at least one external device;
   receiving the calculated information from the at least one external device;
   transmitting the calculated information to the frame buffer; and
   obtaining the calculated information from the frame buffer to display the calculated information.

* * * * *